(12) United States Patent
Niemeyer et al.

(10) Patent No.: US 10,547,773 B2
(45) Date of Patent: Jan. 28, 2020

(54) USER INTERFACE ASPECTS FOR A MOTORIZED MONOPOD JIB FOR CAMERAS

(71) Applicant: Disney Enterprises, Inc., Burbank, CA (US)

(72) Inventors: Gunter D. Niemeyer, Pasadena, CA (US); Sean Kallas, Ventura, CA (US); Avner Swerdlow, Los Angeles, CA (US); Meredith Bailey Antonia Scheff-King, Oakland, CA (US)

(73) Assignee: Disney Enterprises, Inc., Burbank, CA (US)

( * ) Notice: Subject to any disclaimer, the term of this patent is extended or adjusted under 35 U.S.C. 154(b) by 7 days.

(21) Appl. No.: 15/429,666

(22) Filed: Feb. 10, 2017

(65) Prior Publication Data

US 2018/0124304 A1    May 3, 2018

Related U.S. Application Data

(60) Provisional application No. 62/414,445, filed on Oct. 28, 2016.

(51) Int. Cl.
*H04N 5/232* (2006.01)
*F16M 13/04* (2006.01)
*G03B 17/56* (2006.01)

(52) U.S. Cl.
CPC ........ *H04N 5/23203* (2013.01); *F16M 13/04* (2013.01); *G03B 17/561* (2013.01);
(Continued)

(58) Field of Classification Search
CPC .... G03B 17/56; G03B 17/562; G03B 17/563; G03B 17/568; G03B 17/561; H04N 5/2251; H04N 5/23203; H04N 5/2252; F16M 11/04–14; F16M 13/00–08; A45F 2200/0533; A45F 2005/002
See application file for complete search history.

(56) References Cited

U.S. PATENT DOCUMENTS 4,017,168 A    4/1977  Brown
4,946,272 A    8/1990  Brown
(Continued)

FOREIGN PATENT DOCUMENTS

CN    202647109 U    1/2013
CN    203811969 U    9/2014
(Continued)

OTHER PUBLICATIONS

Gil Zamorano, Gunnar, European Search Report for European Patent Application Serial No. 17194823, Mar. 7, 2018, 3 pages, Munich, Germany.
(Continued)

*Primary Examiner* — Paul M Berardesca
(74) *Attorney, Agent, or Firm* — Patterson + Sheridan, LLP

(57) ABSTRACT

An embodiment provides a monopod jib for cameras, including: a pole; a multi-axis gimbal disposed at one end of the pole; and a user interface comprising: a first user interface element having a first plurality of camera controls; and a second user interface element having a second plurality of camera controls. Other embodiments are shown and described.

20 Claims, 15 Drawing Sheets

(52) U.S. Cl.
CPC ....... *G03B 17/563* (2013.01); *H04N 5/23216* (2013.01); *H04N 5/23293* (2013.01); *H04N 5/23296* (2013.01)

(56) References Cited

U.S. PATENT DOCUMENTS

| | | | |
|---|---|---|---|
| 5,065,249 | A | 11/1991 | Horn et al. |
| 5,963,749 | A | 10/1999 | Nicholson |
| 6,611,662 | B1 | 8/2003 | Grober |
| 6,808,324 | B2 | 10/2004 | McKay |
| 7,209,176 | B2 | 4/2007 | Chapman |
| 7,241,060 | B2 | 7/2007 | Mootz et al. |
| 7,355,627 | B2 | 4/2008 | Yamazaki et al. |
| 7,522,213 | B2 | 4/2009 | Chapman |
| 7,931,412 | B2 | 4/2011 | Brown |
| 8,125,564 | B2 | 2/2012 | Kozlov et al. |
| 8,143,083 | B2 | 3/2012 | Ohta |
| 8,534,934 | B1 | 9/2013 | Carney |
| 9,156,154 | B2 | 10/2015 | Brown et al. |
| 9,360,740 | B2 | 6/2016 | Wagner et al. |
| 9,454,064 | B2 | 9/2016 | Roberts et al. |
| 9,534,730 | B2 | 1/2017 | Black et al. |
| 9,749,522 | B2 | 8/2017 | Holmes |
| 9,765,926 | B2 | 9/2017 | Chen et al. |
| 9,798,221 | B2 | 10/2017 | Niemeyer et al. |
| 9,851,046 | B2 | 12/2017 | Pan et al. |
| 9,874,308 | B2 | 1/2018 | Saika et al. |
| 9,904,147 | B2 | 2/2018 | Zhao |
| 9,921,459 | B2 | 3/2018 | Wagner et al. |
| 9,973,665 | B2 | 5/2018 | Saha et al. |
| 10,107,446 | B2 | 10/2018 | Pan et al. |
| 10,208,887 | B2 | 2/2019 | Tian et al. |
| 2004/0223078 | A1 | 11/2004 | Zadok |
| 2005/0185089 | A1 | 8/2005 | Chapman |
| 2009/0003822 | A1* | 1/2009 | Tyner .................... F16M 11/32 396/428 |
| 2011/0158619 | A1 | 6/2011 | Kanayama |
| 2012/0099851 | A1 | 4/2012 | Brown |
| 2014/0350395 | A1 | 11/2014 | Shachaf et al. |
| 2015/0219981 | A1 | 8/2015 | Roberts et al. |
| 2016/0033077 | A1 | 2/2016 | Chen et al. |
| 2016/0170289 | A1 | 6/2016 | Matt |
| 2016/0246162 | A1 | 8/2016 | Niemeyer et al. |
| 2016/0309080 | A1 | 10/2016 | Chu et al. |
| 2016/0323496 | A1* | 11/2016 | Tsai .................. H04N 5/23203 |
| 2017/0159875 | A1 | 6/2017 | Wagner et al. |
| 2017/0192341 | A1* | 7/2017 | Casarez ............... G03B 17/561 |
| 2017/0227162 | A1* | 8/2017 | Saika ..................... F16M 13/02 |
| 2018/0149949 | A1 | 5/2018 | Kim et al. |
| 2018/0273203 | A1 | 9/2018 | Zhang et al. |
| 2018/0274720 | A1 | 9/2018 | Gubler et al. |
| 2018/0335178 | A1 | 11/2018 | Bin et al. |
| 2019/0002125 | A1 | 1/2019 | Bin et al. |

FOREIGN PATENT DOCUMENTS

| | | |
|---|---|---|
| CN | 203812021 U | 9/2014 |
| CN | 104360690 A | 2/2015 |
| CN | 204227000 U | 3/2015 |
| CN | 204437648 U | 7/2015 |
| CN | 106168326 A | 11/2016 |
| EP | 2919064 A1 | 9/2015 |
| EP | 3316567 A1 | 5/2018 |
| ES | 2564393 A1 | 3/2016 |
| KR | 20160099437 A | 8/2016 |
| WO | 2016190994 A1 | 12/2016 |

OTHER PUBLICATIONS

Afanasiev, Andrey, European Search Report for European Patent Application No. 16183612, Mar. 17, 2017, 3 pages, The Hague, Netherlands.

Lantsheer, Martijn, European Search Report for European Application No. EP18178234, dated Oct. 30, 2018, The Hague, Netherlands, 6 pages.

* cited by examiner

USER INTERFACE ASPECTS FOR A MOTORIZED MONOPOD JIB FOR CAMERAS

CROSS REFERENCE TO RELATED APPLICATIONS

This application claims priority to U.S. Provisional Patent Application Ser. No. 62/414,445, filed on Oct. 28, 2016 and entitled "User Interface Aspects for a Motorized Monopod Jib for Cameras," the content of which is incorporated by reference herein.

BACKGROUND

Monopod jibs (a monopole or pole or boom having an attachment for a camera) are used to capture certain shots, e.g., when a camera needs to be extended outward from a camera operator. Certain monopod jibs are equipped with a gimbal, i.e., an arrangement that acts to facilitate or control movement of the camera mounted on the monopole. For example, a gimbal may be used to balance or counterbalance a camera, buffering it from motion. Additionally, certain monopod jibs are provided with a multi-axis gimbal, which may be motorized, e.g., one or more motors may be provided to actively control movement of the gimbal components, and thus the camera.

BRIEF SUMMARY

In summary, an embodiment provides a monopod jib for cameras, comprising: a pole; a multi-axis gimbal disposed at one end of the pole; and a user interface comprising: a first user interface element having a first plurality of camera controls; and a second user interface element having a second plurality of camera controls.

Another embodiment provides a system, comprising: a monopod jib for cameras, comprising: a pole; a multi-axis gimbal disposed at one end of the pole; a battery box disposed at the opposite end of the pole; and a user interface comprising: a first user interface element having a first plurality of camera controls; and a second user interface element having a second plurality of camera controls.

A further embodiment provides a method, comprising: grasping a monopod jib with a first hand and a second hand; providing inputs to a first user interface element of the monopod jib disposed on the monopod jib and located proximate to the first hand; and providing inputs to a second user interface element of the monopod jib disposed on the monopod jib and located proximate to the second hand; whereby inputs from the first user interface element and the second user interface element control both camera position and image quality of a camera mounted to an end of the monopod jib.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings.

The scope of the embodiments will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail to avoid obfuscation. The following description is intended only by way of example, and simply illustrates certain example embodiments.

While monopod jibs for cameras exist, certain needs have been recognized by the inventors, e.g., for providing improvements in control of the camera in terms of camera positioning and image quality and characteristics.

Accordingly, an embodiment provides a motorized monopod jib for cameras that includes a two part (e.g., one for each hand) user interface (UI), located on the monopole for easy camera operation. An embodiment includes a plurality of motors, e.g., three as used in the non-limiting examples illustrated, which control movement of the camera in coordination with movements of the monopod jib by the operator. Further details regarding coordination of the motors to control the movement (e.g., viewing angle) of the camera are largely omitted to focus on aspects of the user interface described herein.

Example of General Structure

A system overview of an embodiment is provided in FIG. 14, which will be described with particularity herein. However, reference may be made to FIG. 14 throughout, as many of the user interface aspects described in FIG. 1-13 are implemented by way of the components illustrated in FIG. 14.

Figure 1:
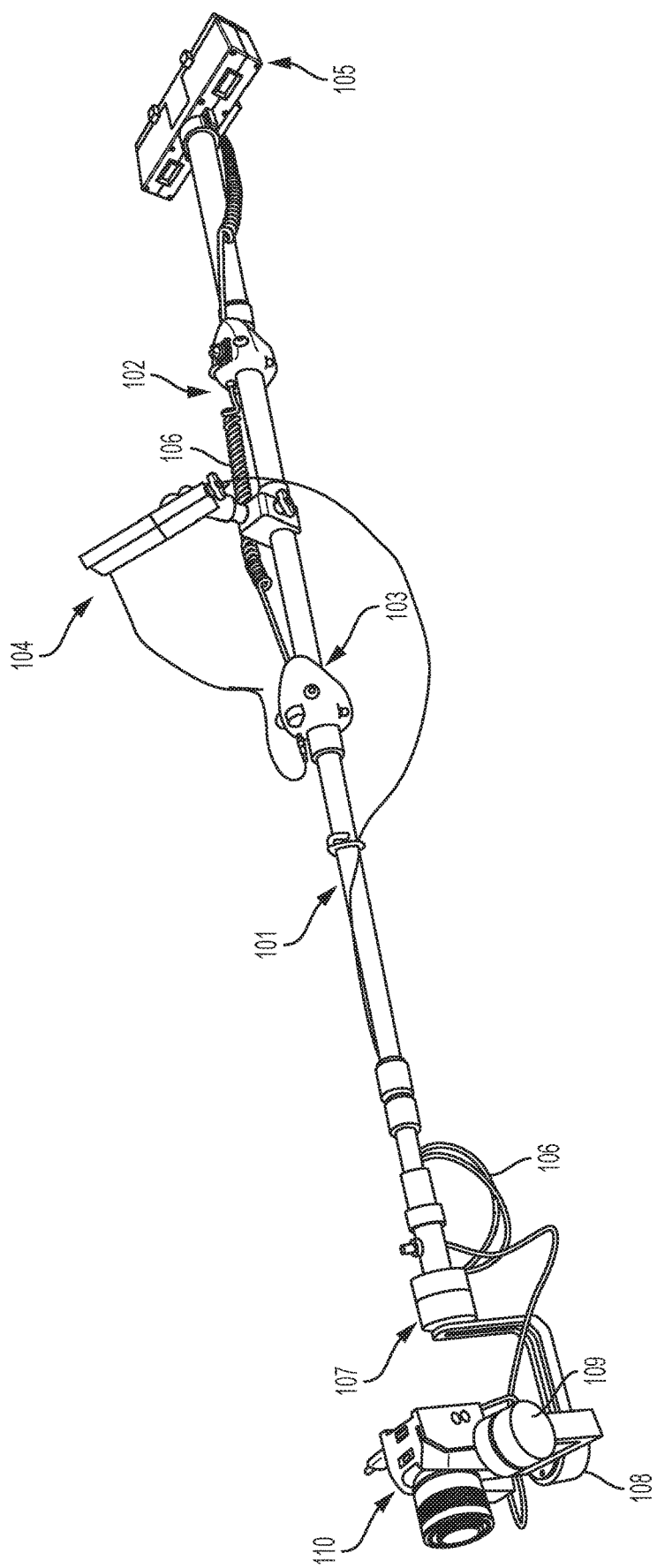
FIG. 1 illustrates an example monopod jib and camera having a user interface according to an embodiment.

Shown in FIG. 1 is a monopod jib 101 and camera 110 that is designed for two handed operation. An embodiment provides a two part user interface, the locations of which are denoted at 102 and 103 of FIG. 1. The location the user interface elements 102, 103 are provided such that a camera operator grasping the monopod jib 101 with two hands will be able to easily interface with the user interface elements 102, 103, i.e., one with each hand. To manage the full weight and size of the monopod jib 101 and camera 110, both hands may be necessary. Additionally, there is a plurality of controls provided by the user interface elements 102, 103, such that, in an embodiment, the controls are split between the user interface elements 102, 103 to accommodate controls for both hands.

In an embodiment, the monopod jib 101 includes a monitor 104 to view the output (images, video) of the camera 110. The monitor 104 in the example of FIG. 1 is mounted between the two pole mounted user interface elements 102, 103. The monitor 104 may be placed elsewhere, even off the monopod jib 101, and does not need to be directly or physically tied to the monopod jib 101 architecture.

Figure 14:
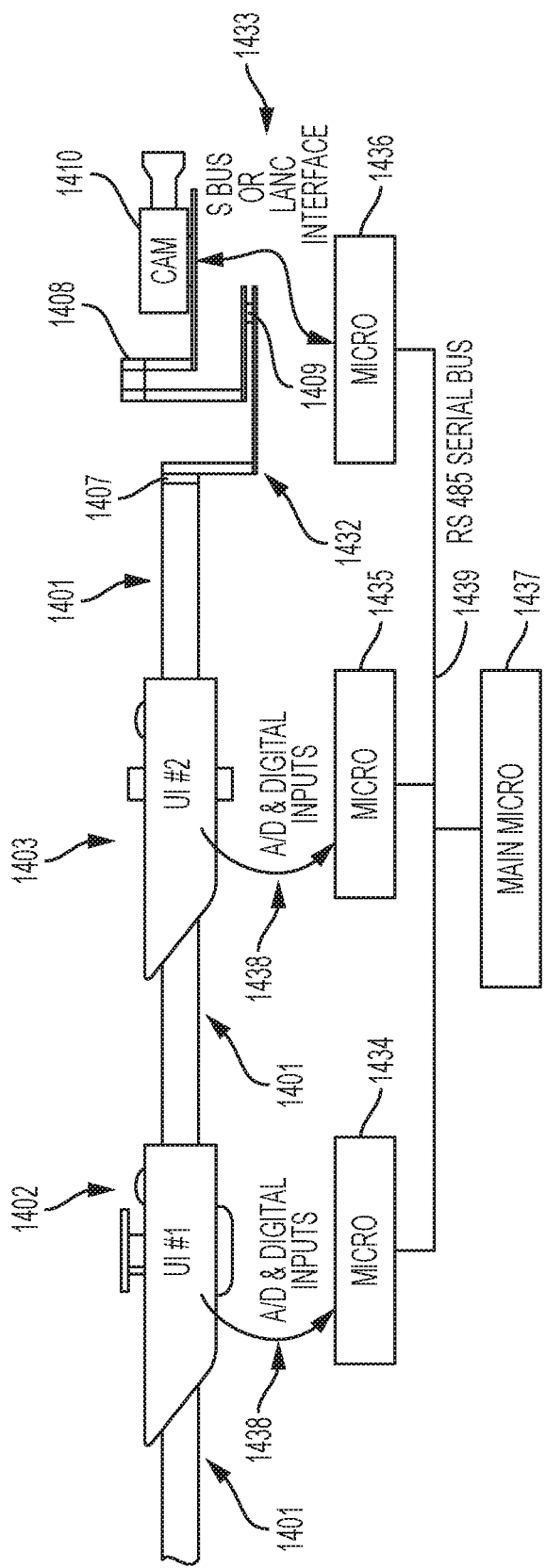
FIG. 14 illustrates a diagram of an example system according to an embodiment.

The camera 110 shown in FIG. 1 is mounted on an end of the monopod jib 101 (by way of a gimbal, denoted at 1432 in FIG. 14). The camera is attached to the main part of the monopod jib 101 via a multi-axis gimbal (e.g., a three axis gimbal as shown in FIG. 1). The camera's viewing angle is controlled by three motors 107, 108 and 109, which offer three axes of rotation.

The camera 110 provides both a video output as well as a control-input-port, where communication of audio/video data and control communications is accomplished by cabling 106. Different types of cabling 106 may be utilized, and different examples thereof are further described herein with respect to the data and/or ports utilized. In an embodiment, the video output of the camera 110 is directly connected to the monitor 104 and the camera 110 accesses control inputs (provided by the user interface elements 102, 103) to change settings.

At an opposite end of the monopod jib 101 a battery box 105 is provided. The battery box provides a source of power for the system as well as a control compartment with a panel containing a variety of configuration switches for the system, as further described in connection with FIG. 2 and FIG. 3.

Figure 2:
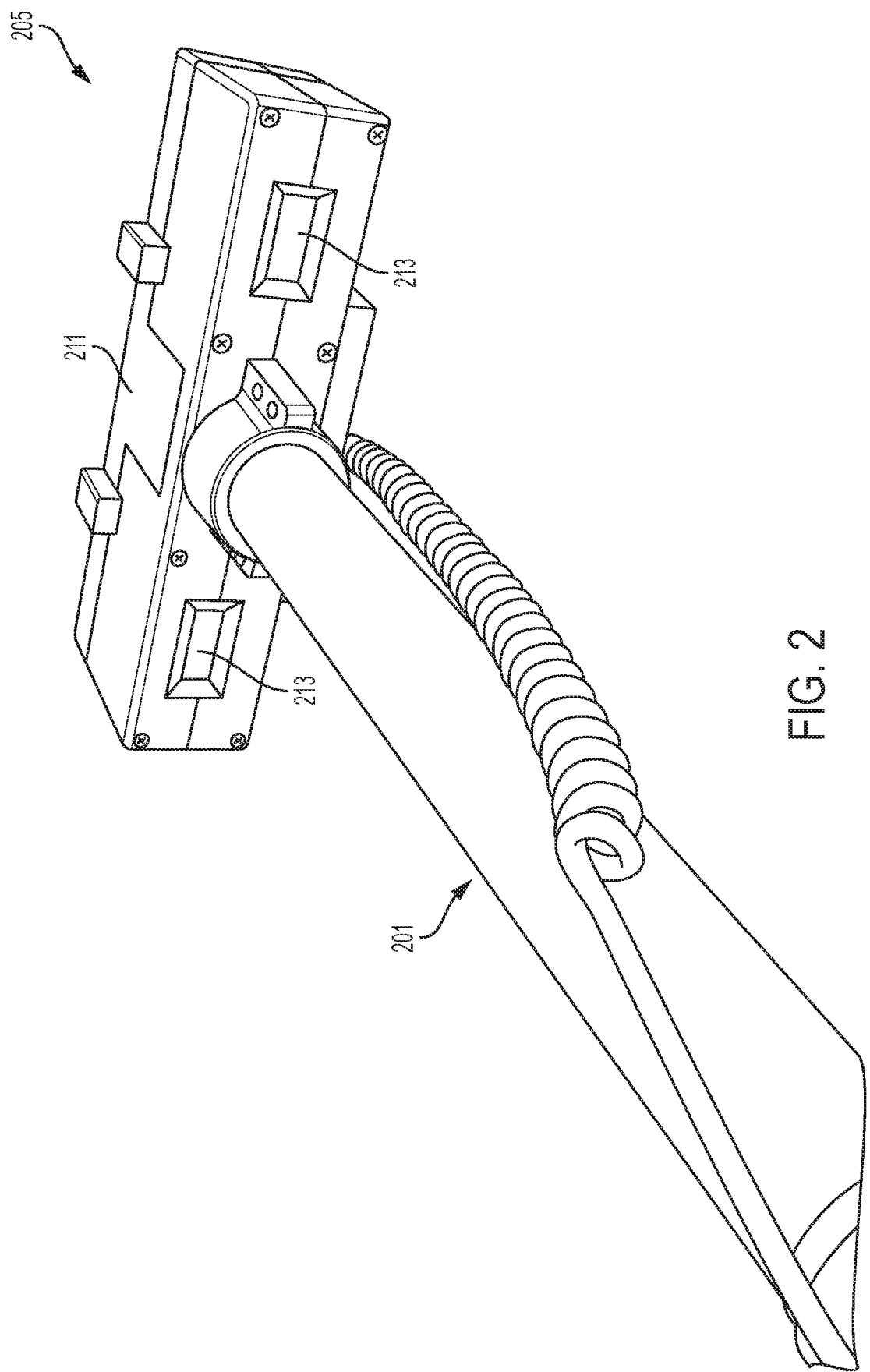
FIG. 2 illustrates an example first end of the monopod jib.
Figure 3:
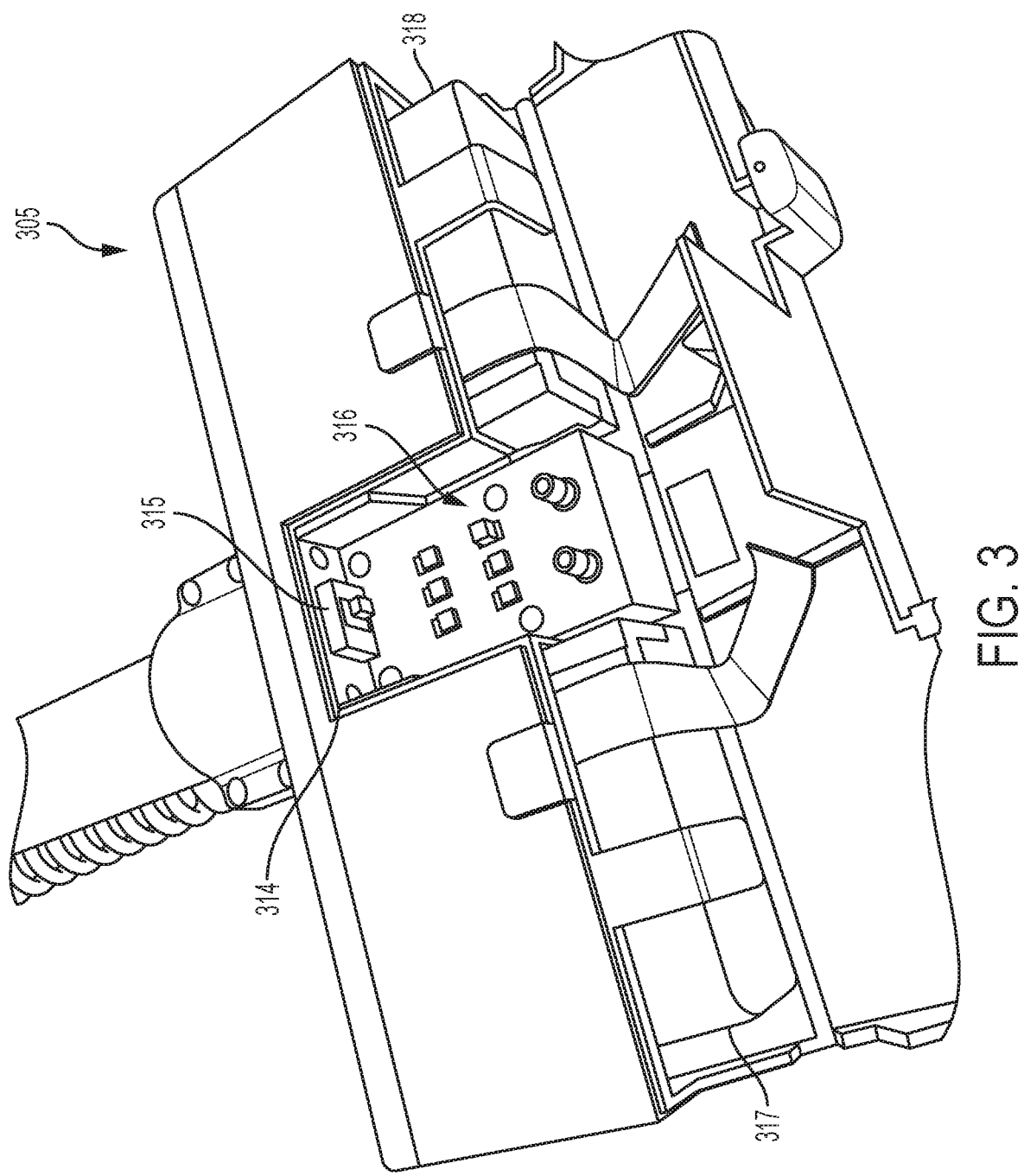
FIG. 3 illustrates a perspective view of example controls included in the first end of the monopod jib.

Referring to FIG. 2-FIG. 3, the battery box 205/305 is located at an end of the monopod jib 101/201 as compared to the location of the camera 110, e.g., to counterbalance the weight of the camera 110. The battery box 205/305 contains a control compartment 314 (in FIG. 2 the control compartment is covered by lid 211) with several configuration switches 316.

The configuration switches 316 are read directly by the main microcontroller (1437 of FIG. 14, which may be located in the battery box 305) and change the functionality of software that implements system functions. The configuration switches 316 include, for example, control of user interface 102, 103 sensitivity (e.g., gain), camera 110 direction control (e.g., pan/tilt), gimbal 1432 control (e.g., orienting control for physical arrangement of the gimbal 1432), reference axis adjustment (e.g., world view versus body reference mode), other camera adjustments, and an on/off switch 315 for the system. Further description of the configuration switches 316 is deferred until description of the user interface elements 102, 103 and other system elements is made.

The battery box 205/305 further includes one or more batteries, two of which are illustrated at 317, 318 in the example of FIG. 3. The battery box 205 also provides, in an embodiment, display panels 212, 213, e.g., for providing a battery output voltage and status/error indicator(s), respectively.

Example Controls of the First User Interface

Figure 4:
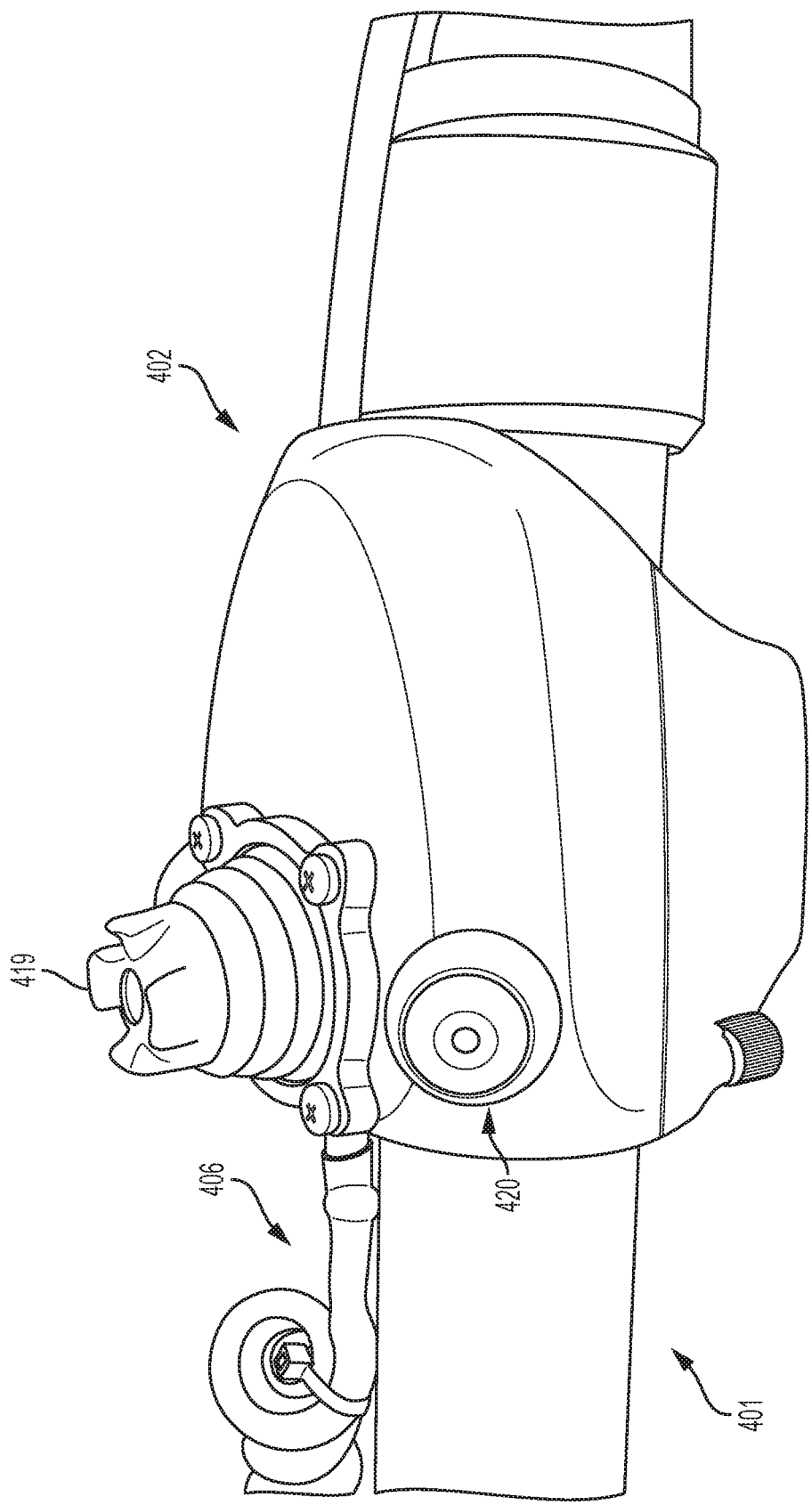
FIG. 4 illustrates a side view of an example of a first user interface on the monopod jib.
Figure 5:
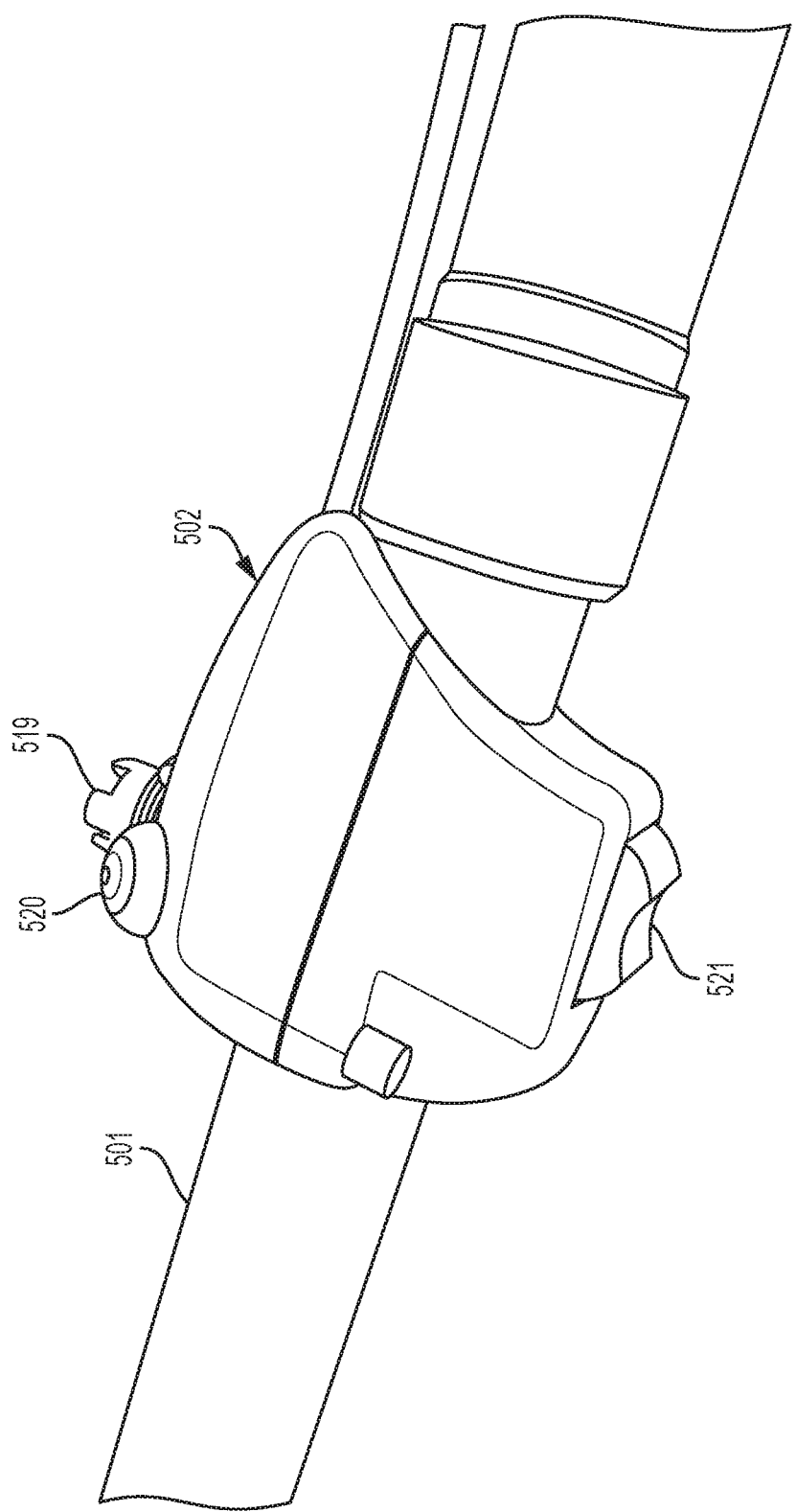
FIG. 5 illustrates an underside view of the first user interface.

Referring to FIG. 4-5, in an embodiment, the first user interface 402/502 is configured as a main user interface and controls the continuous pan/tilt/zoom of the camera 110. That is, the first user interface 402/502 may be used by an operator to set up the shot.

A pan/tilt joystick 419/519 is provided on a top side of the first user interface 402/502 mounted on monopod jib 401/501. In an embodiment the pan/tilt joystick 419/519 is controlled by the operator's thumb (refer to FIG. 10 for a view of an operator grasping the first user interface element 1002). The pan/tilt joystick 419/519 moves in two degrees of freedom (i.e., left/right as well as forward/backward) to control pan (side-to-side movement) as well tilt (up/down movement) of the camera 110, e.g., by coordinated control of motors 107, 108 and 109. In an embodiment, the pan/tilt joystick 419/519 is non-contact (i.e., magnetically measured without any brushing) for smooth operation. The pan/tilt joystick 419/519 has a centering force so that it returns to zero or a predefined rest position when let go. In an embodiment, the pan/tilt joystick 419/519 is continuous pressing, i.e., pressing harder moves the camera 110 faster (applies gain).

The main microcontroller 1437 converts the pan/tilt joystick 419/519 position, which may be communicated by wire or cabling 406, into appropriate command(s) for the motors 107, 108 and/or 109, sent to the motor microcontrollers for execution. Likewise, the main microcontroller 1437 converts the button input(s) (e.g., of button 420/520), if any, into appropriate commands for the system element in question, as further described herein.

As illustrated in FIG. 5, a zoom rocker switch 521 is located at the bottom side of the first user interface element 502. In an embodiment the zoom rocker switch 521 is intended for operation by an index finger or possibly another finger of the operator (refer to FIG. 10 for a view of an operator grasping the first user interface element 1002). Pulling back/pushing forward on the zoom rocker switch 521 is converted (e.g., by main microcontroller 1437) into a camera command to zoom the camera 110 in/out. The zoom rocker switch 521 is also continuous or has gain applied, i.e., pushing harder zooms faster. The zoom rocker switch 521 includes a centering spring so that releasing pressure on the zoom rocker switch 521 stops or arrests the zoom. In an embodiment, the zoom rocker switch 521 is also non-contact for smooth operation.

The main microcontroller 1437 converts the zoom rocker switch 521 position into appropriate camera commands, sent to the camera microcontroller 1436 for further communication to the camera 110, e.g., using a camera API.

Figure 7:
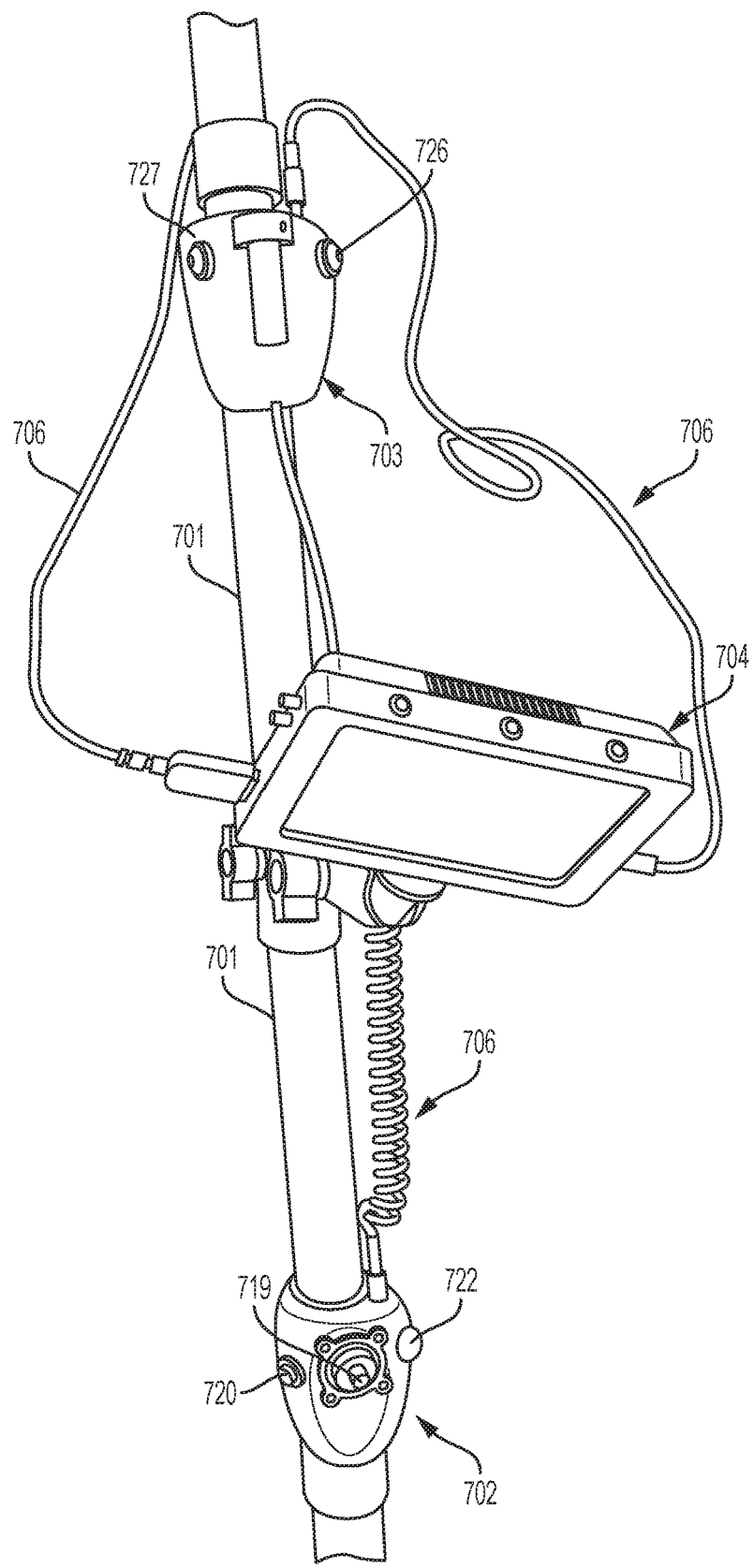
FIG. 7 illustrates a view of the first user interface, the monitor and a second use interface on the monopod jib.

In an embodiment, the first user interface 402/502 includes a left button 420/520 and a right button (illustrated at 722 in FIG. 7). While a variety of functions may be assigned to the left button 420/520 and the right button 722 (as well as other buttons of the user interface), an embodiment implements a rest mode for the left button 420/520. That is, the system (main microcontroller 1437) may be instructed to place the system in a low power mode responsive to user input to the left button 420/520. The rest mode is useful, for example, when putting the monopod jib 401/501 down while the camera 110 should no longer track or be actively servo-ed. A single click to the left button 420/520 enables (wakes) the system, e.g., via action of the main microcontroller 1437. In an embodiment, a double click to the left button 420/520 is required to disable/rest the system. Thus, a single accidental touch/click of the left button 420/520 will not turn anything off (rest the system inadvertently). The main microcontroller 1437 observes the left button 420/520 state and changes the system operation accordingly.

Referring briefly to FIG. 7, in an embodiment the right button 722 of the first user interface element 703 is located on the other side of the pan/tilt joystick 719 and controls white balance. Each press of the right button 722 cycles through a preset assortment of white balance levels. The main microcontroller 1437 passes right button 722 information to the camera microcontroller 1436 to communicate to the camera 110 via a communication bus 1433 (e.g., S-bus or LANC or similar communication bus). In an embodiment, the buttons 420/520, 722 are also be used to turn on/off recording or other features available on the camera 110.

Figure 6:
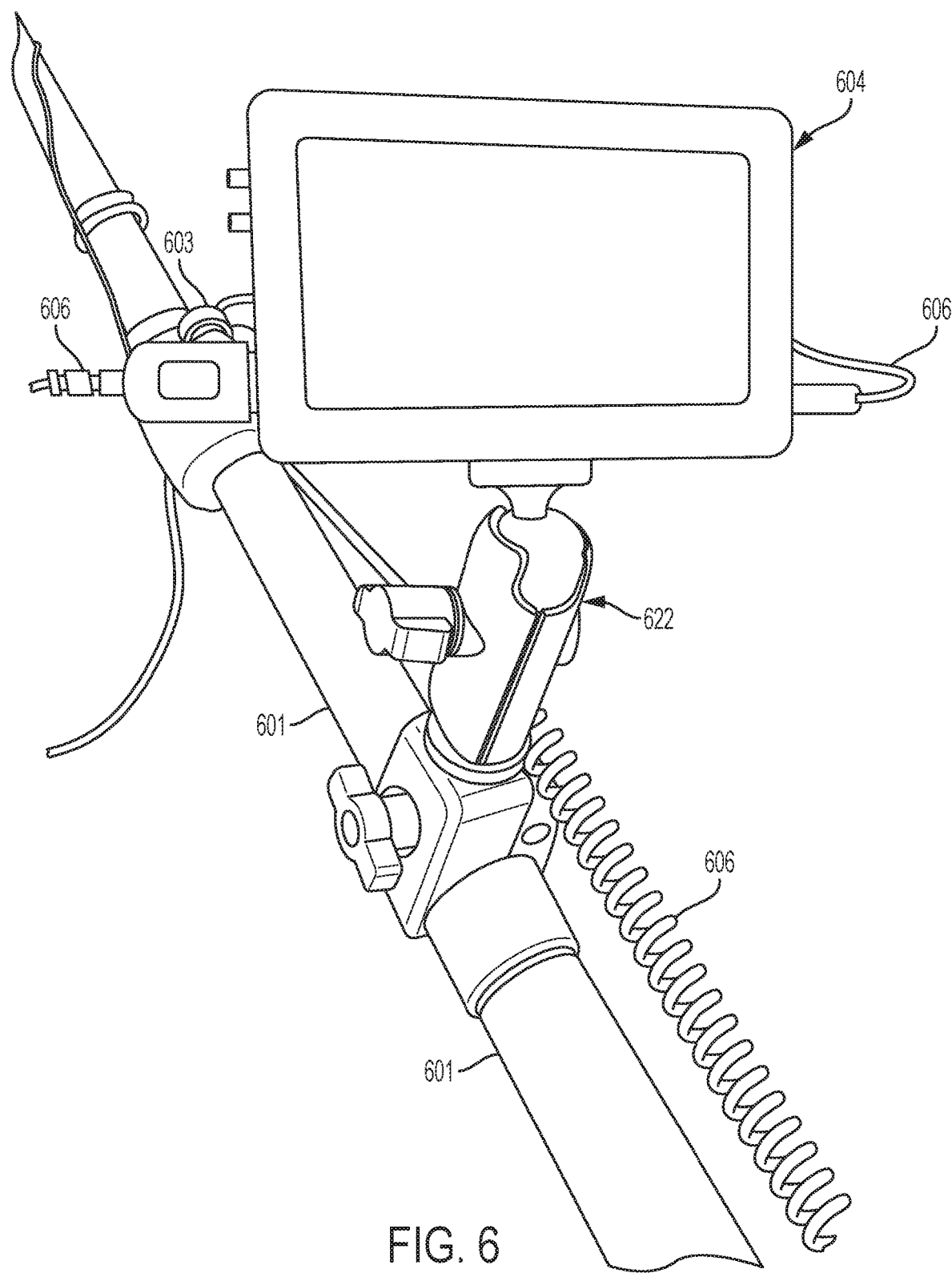
FIG. 6 illustrates an example monitor of the monopod jib.

Referring to FIG. 6 and FIG. 7, the monitor 604/704 provides a live feed for the operator to frame the shot viewed by the camera 110 as well as to adjust the image appearance, e.g., adjust the focus, the iris, the white balance, etc. The monitor 604/704 also provides recording capability (e.g., if the camera 110 does not record on-board). Power to the monitor 604/704 (and/or other components of the system) may be provided via cabling 606/706 connecting the monitor 604/704 directly to batteries 317, 318. Alternatively, power may be supplied via a connection to a power port on the second user interface 603 (or potentially elsewhere). The video signal or image data is passed from the camera 110 via cabling 606/706 to the monitor 604/704. It is noted that in the figures the cabling 606/706 is generally indicated, with the understanding that a particular cable type, e.g., HDMI cable for video data transmission, may be used, e.g., depending on the type of port(s) available on the monitor 604/704 and other components.

As illustrated particularly in FIG. 6, in an embodiment the monitor 604 is mounted onto the monopod jib 601 using a ball and socket type mount 622. This permits the monitor 604 to be adjusted to varying viewing angles and offers the operator a wide variety of options in viewing the monitor 604 during use.

As illustrated particularly in FIG. 7, in an embodiment, the monitor 704 is located or positioned on the monopod jib 701 between the first user interface element 702 and the second user interface element 703. This location may be useful, for example, for ensuring that the weight balance of the monopod jib 701 is maintained as well as providing for easy access to the monitor 704 with either hand.

For spatial reference, the left and right buttons 720, 722 of the first user interface element 702 and the left and right buttons 726, 727 of the second user interface element 703 are indicated in FIG. 7.

Example Controls of the Second User Interface

Figure 8:
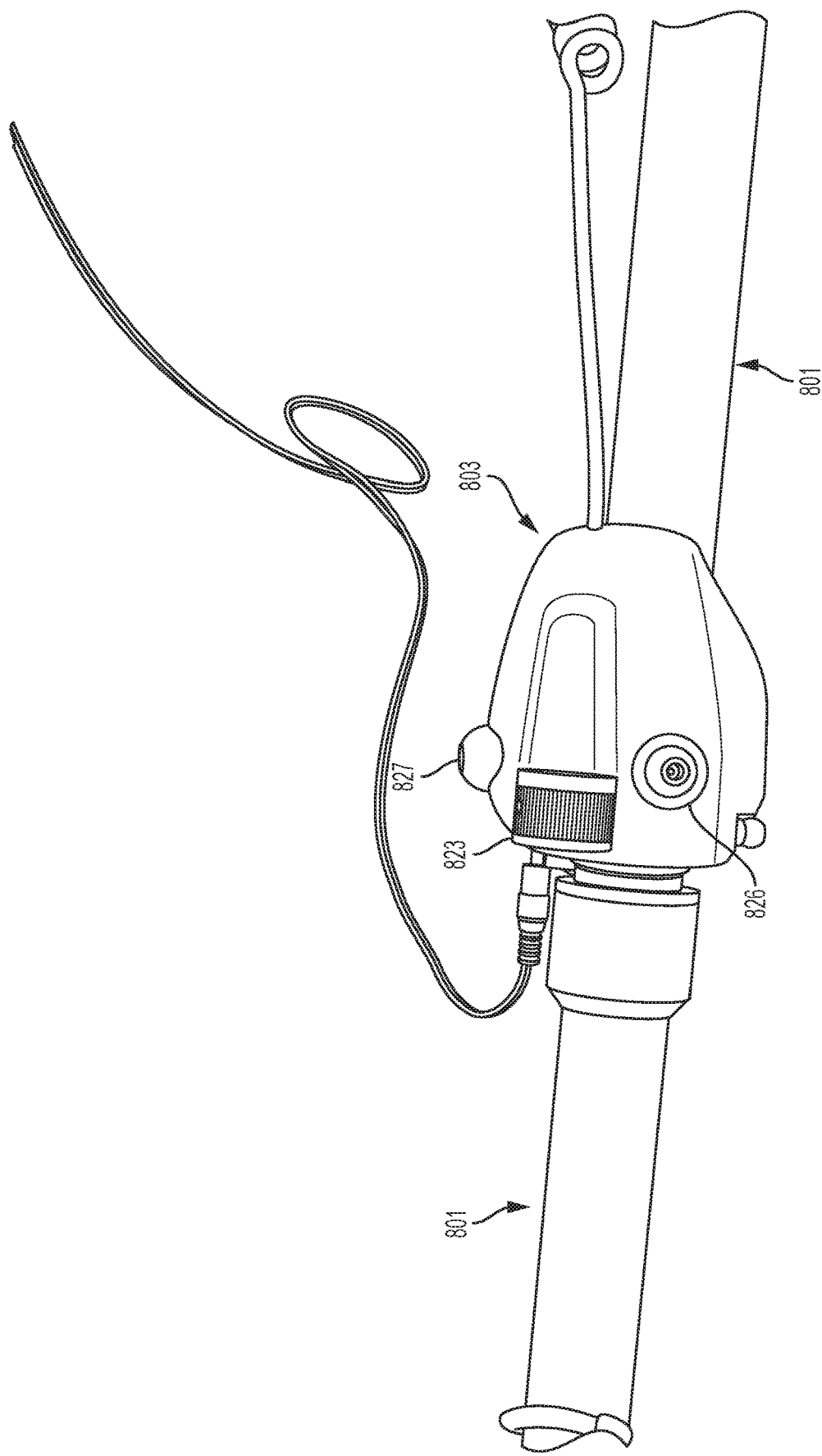
FIG. 8 illustrates an example of the second user interface of the monopod jib.

FIG. 8 illustrates a second user interface element 803 mounted onto the monopod jib 801 according to an embodiment. In an embodiment, the second user interface element 803 includes controls for focus, iris, as well as gain, and generally adjusts the image quality captured by the camera 110 by altering the camera settings remotely.

The locations of the left and right buttons 826, 827 of the second user interface element 803 are indicated. In an embodiment, the left button 826 controls the camera's 110 shutter. For example, each press of the left button 826 cycles through preset shutter values. The right button 827 controls the camera's 110 gain. Again, each press of the right button 827 may cycle through the camera's 110 preset gain values. The main microcontroller 1437 observes both buttons 826, 827 and tells the camera microcontroller 1436 to communicate appropriate commands to the camera 110.

The second user interface element 803 includes a focus wheel 823, which as illustrated in the non-limiting example of FIG. 8 is located on the top side of the second user interface element 803. In an embodiment, the focus wheel 823 controls the camera's 110 focus and is intended for control by a thumb of the operator's second hand (refer to FIG. 11).

The focus wheel 823 moves side-to-side in a rolling motion and in an embodiment the direction of roll is oriented the same as a focus ring on the camera 110. The focus wheel 823 provides smooth rolling movement for adjusting the focus of the camera 110, with a light resistive force to make for easy control without spinning by itself. In an embodiment, the feel of a regular focus ring on the camera 110 is mimicked by the focus wheel 823 of the second user interface element 803. The main microcontroller 1437 observes the focus wheel 823 as it moves, and passes data corresponding to the position of the focus wheel 823 to the camera microcontroller 1436 for communication to the camera 110.

Figure 9:
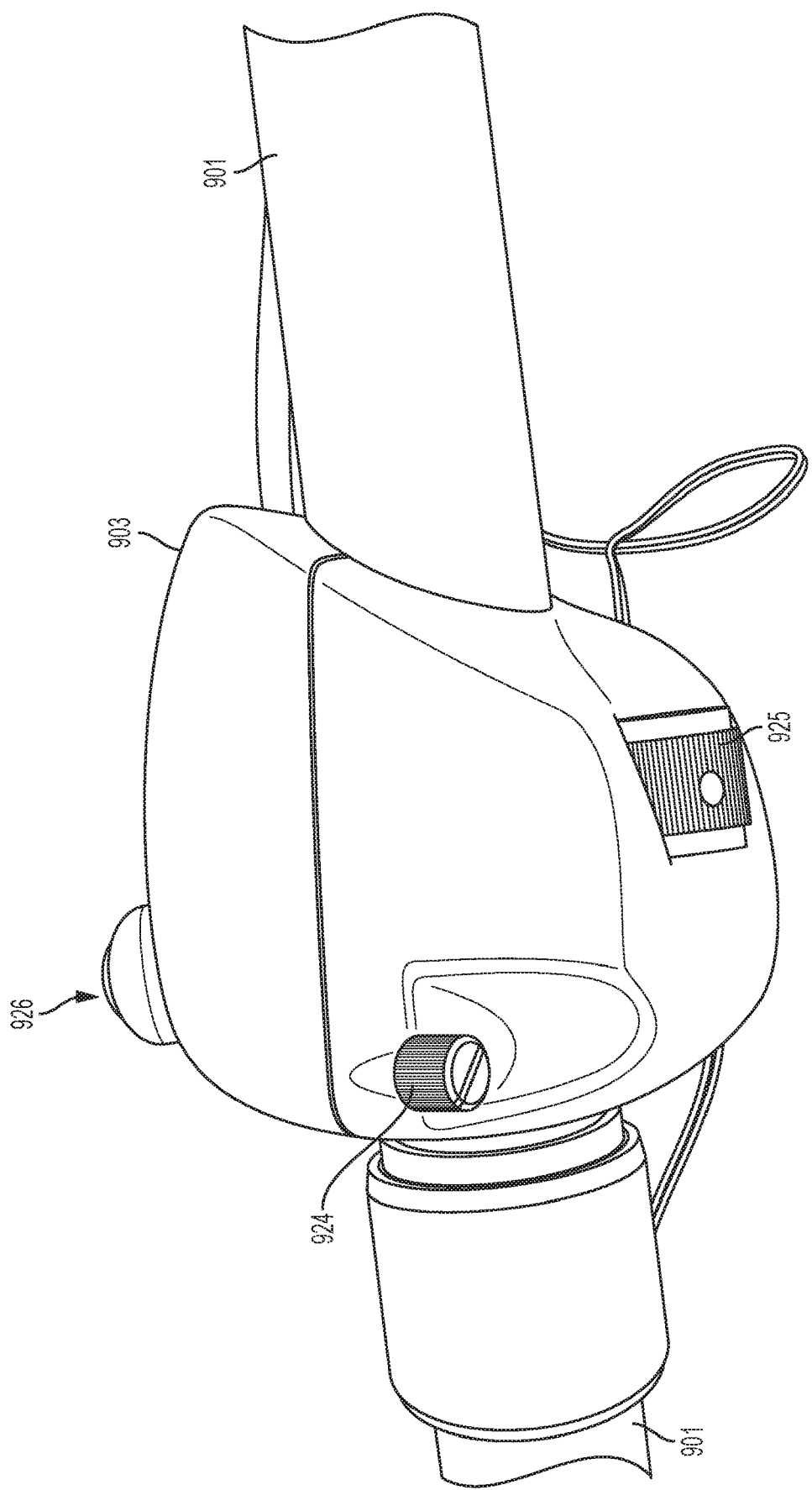
FIG. 9 illustrates an underside view of the first user interface.

Referring to FIG. 9, the second user interface element 903 includes an iris wheel 925 that is located for example on the bottom side of the second user interface element 903 (the left button 926 of the second user interface 903 is visible in FIG. 9). In an embodiment, the iris wheel 925 is intended for control by an index or possibly other finger of the operator (refer to FIG. 11). The iris wheel 925 also moves side-to-side (parallel to the direction of movement of the focus wheel) and parallel to a normal iris ring on the camera 110. In an embodiment, the iris wheel 925 features detents to indicate the discrete stop points. The main microcontroller 1437 observes the iris wheel 925 motion and passes the appropriate information regarding the iris wheel 925 stop point to the camera microcontroller 1436 for communication to the camera 110.

The second user interface element 903 is attached to the monopod jib 901 using a fastening mechanism, for example screws (one of which is illustrated at 924). The fastening mechanism allows for repositioning of the second user interface element 903 on the monopod jib 901, e.g., by loosening the screws and moving the second user interface element 903. The first user interface element 102 may likewise be attached to the monopole 101 via a fastening mechanism that allows for repositioning of the first user interface element 102. In an embodiment where the user interfaces 102, 103 may be repositioned, the cabling is provided with additional length or extensibility to accommodate repositioning.

In addition to the non-limiting example aspects of the user interfaces 102, 103, an embodiment may provide other user interface options. For example, in an embodiment, buttons or other control elements of the user interface elements 102, 104 enable recording on/off control of the camera 110, autofocus on/off setting on the camera 110, and auto-iris on/off setting of the camera 110. Ultimately, using the pan/tilt joystick 419 or other inputs to control of the menu of the camera 110 provides full control of the camera without reaching the body of the camera 110.

In an embodiment, the camera APIs are used to provide remote control of the camera 110 via the various user interface elements 102, 103 and controls thereof. For example, a camera 110 (e.g., a BLACK MAGIC camera) may use an S-Bus interface, which is a serial bus with a particular communication protocol, popular among radio control and drone operations. Thus, control inputs received via the buttons or wheels of the user interface elements 102, 103 may be appropriately mapped to and communicated using a particular protocol. Other options include but are not limited to a LANC interface, which is also a serial bus with a different communication protocol. LANC is more universal among cameras. Therefore, the communication protocol may be chose based on a variety of factors.

Referring back to FIG. 3, the battery box contains a compartment with several configuration switches 316, which may be implemented as physical switches, dials, etc. The configuration switches 316 are read directly by the main microcontroller 1437 and change the functionality of the software controlling the system. The configuration switches 316 include, for example, the following.

The configuration switches 316 include a switch for changing the pan/tilt joystick 419 sensitivity. Depending on the setting of the configuration switch, the system will pan/tilt faster or more slowly in response to movement of the pan/tilt joystick 419.

The configuration switches include a switch for inverting the pan/tilt direction that results from movement (left/right or up/down) of the pan/tilt joystick 419. When the pan/tilt joystick 419 is read, the commands can be negated based on the setting of this switch. For example, pushing forward could imply tilting down or tilting up based on the setting of this configuration switch.

Figure 15:
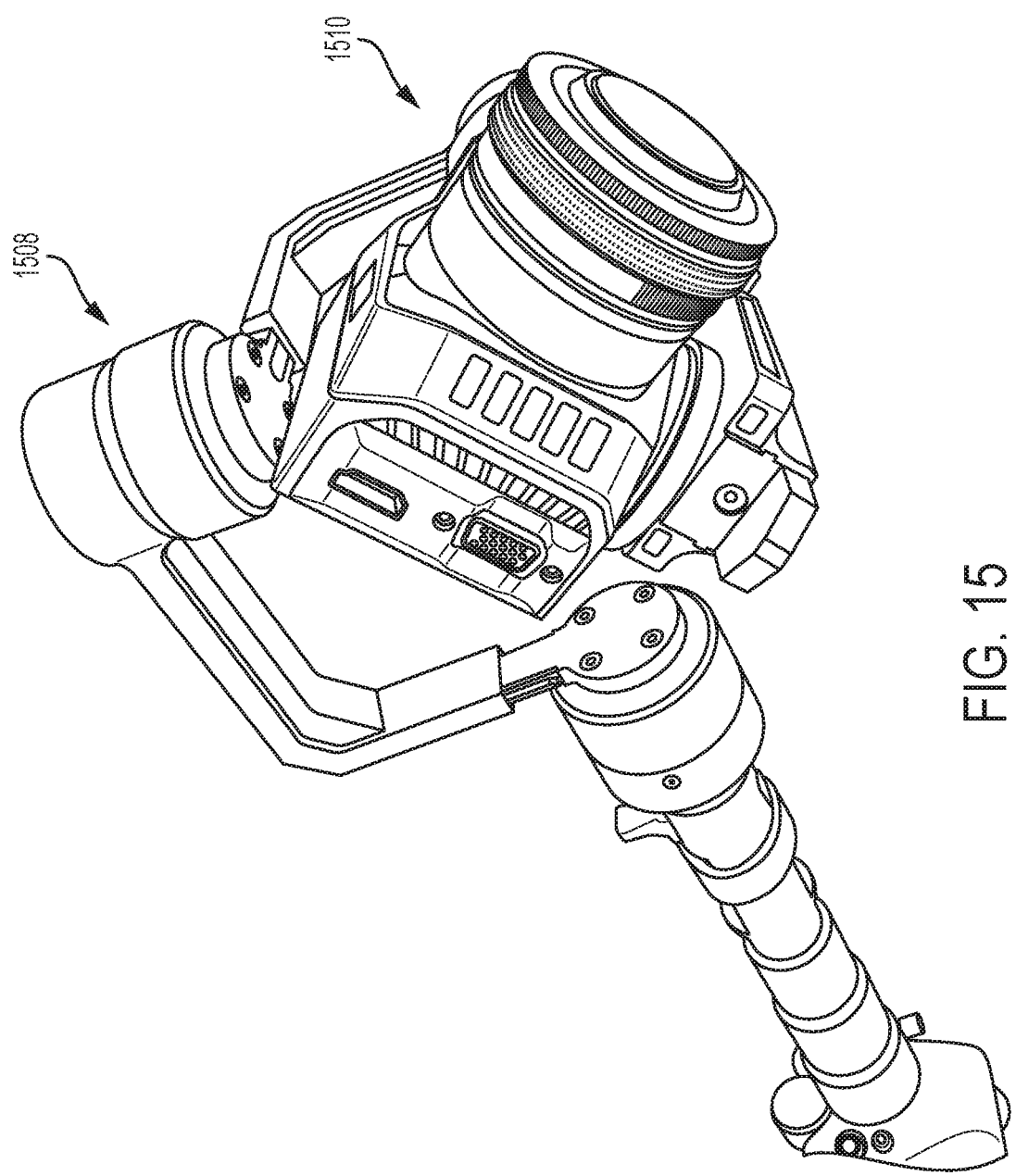
FIG. 15 illustrates an example of gimbal reconfiguration according to an embodiment.

The configuration switches include a switch for handling of a change in orientation of the gimbal, e.g., flipping the gimbal up or down by an operator (as illustrated in FIG. 15). For example, normally, i.e., in a standard orientation (shown in FIG. 1), the second motor 108 sits below the camera 110. This position for the second motor 108 can be awkward when filming at a downward angle. A configuration switch mechanically reconfigures the gimbal to place the second motor 1508 above the camera 1510 (as illustrated in FIG. 15).

A configuration switch is included to toggle between world and body reference mode. For example, under normal (body reference) operation, turning the entire monopod jib 101 about the vertical axis, e.g. rotating to the right, will slowly also point the camera 110 to the right. Usually, when the operator turns right, he or she will also want to film to the right. However, there may be situations when this behavior is not wanted. Thus, a configuration switch is provided to disable this feature and keep the camera 110 pointing in the same direction (relative to the surrounding world) regardless of how the operator moves.

The set of configuration switches 316 also includes a switch for calibrating the gyroscope(s). For example, in an embodiment the monopod jib 101 uses two gyroscopes inside of two IMU (inertial measurement units). The gyroscopes are factory-calibrated, but over time may drift. Enabling this switch will re-calibrate the gyroscopes when the monopod jib 101 is placed at rest.

A configuration switch is included to adjust for the camera mount angle and display. When the camera 110 is initially mounted on the gimbal, it may be mounted at any from a range of angles. That is, the camera 110 may point directly forward or point sideways, etc. The system requires knowledge of the mount angle or orientation to properly control pan/tilt. When operated, this configuration switch displays the current mount angle by pointing the camera 110 directly forward. Should the camera 110 not point directly forward, a camera angle dial can be manually rotated until it does.

The battery box 305 also includes a main ON/OFF switch 315 in the set of configuration switches 316. As described in connection with FIG. 2, in an embodiment all configuration switches 316 of the battery box 205 are internal to the battery box 205, and covered by lid 211, preventing accidental changes.

Referring to FIG. 14, in an embodiment each user interface element 1402, 1403, has a separate microcontroller, indicated at 1434, 1435 respectively. The camera 1410 communicates to the camera microcontroller 1436, for example mounted on the gimbal 1432. A central or main microcontroller 1437 is provided and coordinates the actions of the system. All microcontrollers 1434, 1435, 1436 and 1437 are connected by a communication bus, e.g., via a standard RS 485 serial bus 1439.

It should be noted that in an embodiment, four (4) other microcontrollers are provided, one for each of the three motors 1407, 1408, 1409 that control the moving components of the gimbal 1432 and another microcontroller for an IMU mounted on the monopod jib 1401. These microcontrollers are used for normal operation of the monopod jib 1401, but do not affect the camera controls and are not shown in FIG. 1-15 for ease of illustration.

In operation, the main microcontroller 1437 communicates with (e.g., polls) the user interface microcontrollers 1434, 1435 to detect the state of the input aspects of the user interface elements 1402, 1403 and the battery box 105, e.g., the various switches, buttons, dials, joystick, etc. The user interface microcontrollers 1434, 1435 use analog-to-digital converters and digital inputs (1438) to observe the buttons/switches of the user interface elements. The main microcontroller 1437 then instructs the camera microcontroller 1436 to communicate with and instruct the camera 110.

The camera microcontroller 1436 communicates with the camera 110 using a communication protocol, e.g., as dictated by the camera 110. For example, in an embodiment, an "S-bus" form of serial bus is used by the camera microcontroller 1436 to control the camera 110. In an embodiment, communication via a LANC bus may be used, which is another serial bus popular among cameras (obtainable from, e.g., Sony). Alternatively some cameras use an SDI (serial digital interface), which may be employed by the camera microcontroller 1436 to control the camera 110. In all cases, cameras provide an API, which can be used to command the camera settings.

The two part user interface, as described herein, enables integrated operation as needed by camera operators in a variety of situations. Particular features include but are not necessarily limited to a two-handed design for the user interface. An operator may need both hands to hold the boom (monopod jib 101) and at times may need to re-grasp the boom to accommodate a changing length, changing center of mass, changing operational needs, etc. At the same time, the multitude of functions provided by the user interface may require operation with both hands. Thus, the user interface of an embodiment contains two modules or elements that can be moved with and placed by the operator's hands as he or she grasps the monopod jib 101.

Figure 10:
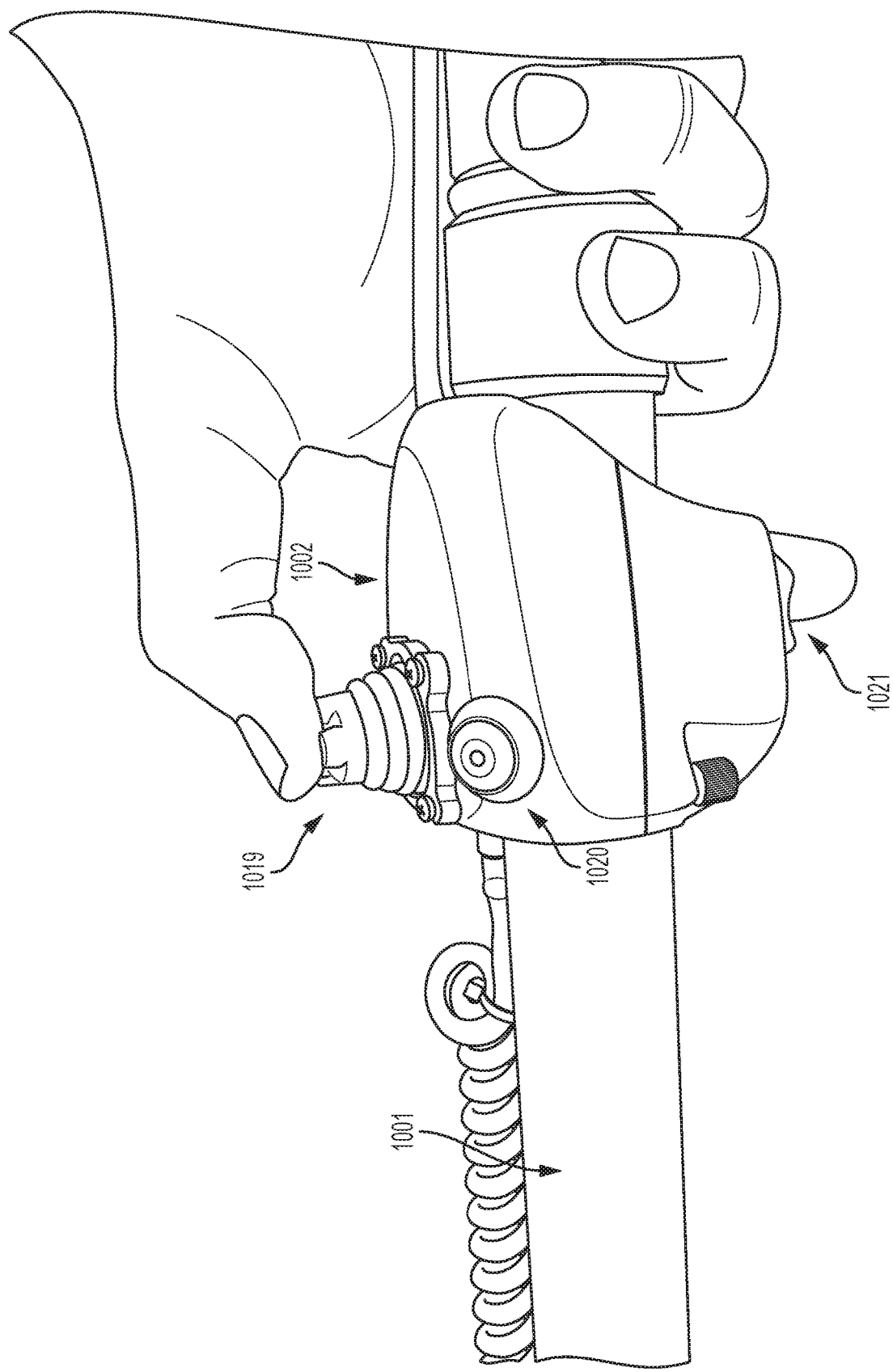
FIG. 10 illustrates a side view of the first user interface.
Figure 11:
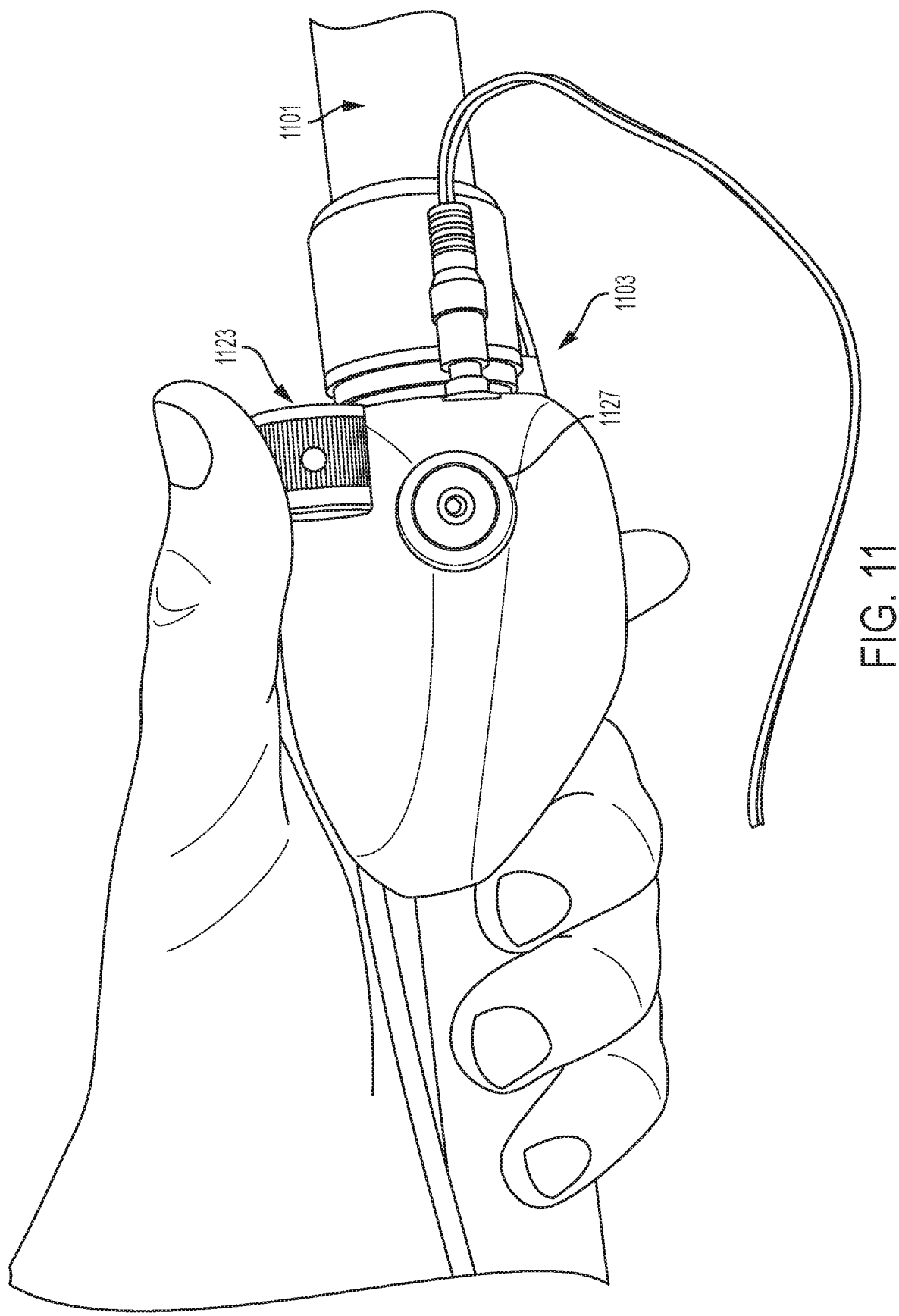
FIG. 11 illustrates a side view of the second user interface.

Referring to FIGS. 10 and 11, a contoured fit is provided by the first user interface element 1002 and the second user interface element 1103 because the operator is holding and manipulating significant weight by directly grasping the monopod jib 1001/1101 (in an embodiment, the monopod jib 1001/1101 multiple pounds). The user interface elements 1002, 1103 are ergonomically positioned on the monopod jib 1001/1101 to sit immediately next to the hands of the operator as he or she grasps the monopod jib 1001/1101 during operation. Moreover, the input elements of the user interface elements 1002, 1103 are positioned to provide appropriate locations for the pan/tilt joystick 1019, buttons 1020, 1127, zoom rocker switch 1021, focus wheel 1123, etc., without interfering with the operator's grasp.

Thus, to provide full functionality with the operator's hands grasping the monopod jib 1001/1101, the user interface of an embodiment distributes the necessary user interface elements to place these under the appropriate finger tips. This leads to elements at the top as well as the bottom of the user interface elements 1002, 1103.

As described herein, fastening mechanism permit for quick mechanical adjustment of the user interface elements 1002, 1103. For example, to facilitate quick operational changes, the user interface elements 1002, 1103 can be re-positioned quickly and easily on the monopod jib 1001/1101.

Additional user interface components may be provided. For example, as has been described herein with respect to the control compartment 314 of the battery box 305, the user interface further provides several mode switches and configuration adjustments at a location aside from the normal grasp locations, e.g., for system setup and occasional adjustments. This separation keeps the primary user interface elements 102, 103 as simple as possible.

It will also be understood that an embodiment applies functionality grouping in placing certain aspects of the user interface in particular locations. For example, to keep the user interface simple and easy-to-use, the primary functions are grouped as follows. The right (rear) hand controls the gimbal 1432 pan/tilt angle via a pan/tilt joystick 419 (e.g., via thumb operation) as well as the camera zoom via a zoom rocker switch 521 (e.g., operated by the index finger). Together, the right (or rearmost) hand provides control of the framing of the shot. The left (or forward) hand meanwhile controls the focus and iris via wheels 823, 925, operated for example by thumb and index finger. The left (or forward) hand allows the operator to optimize the image.

Figure 12:
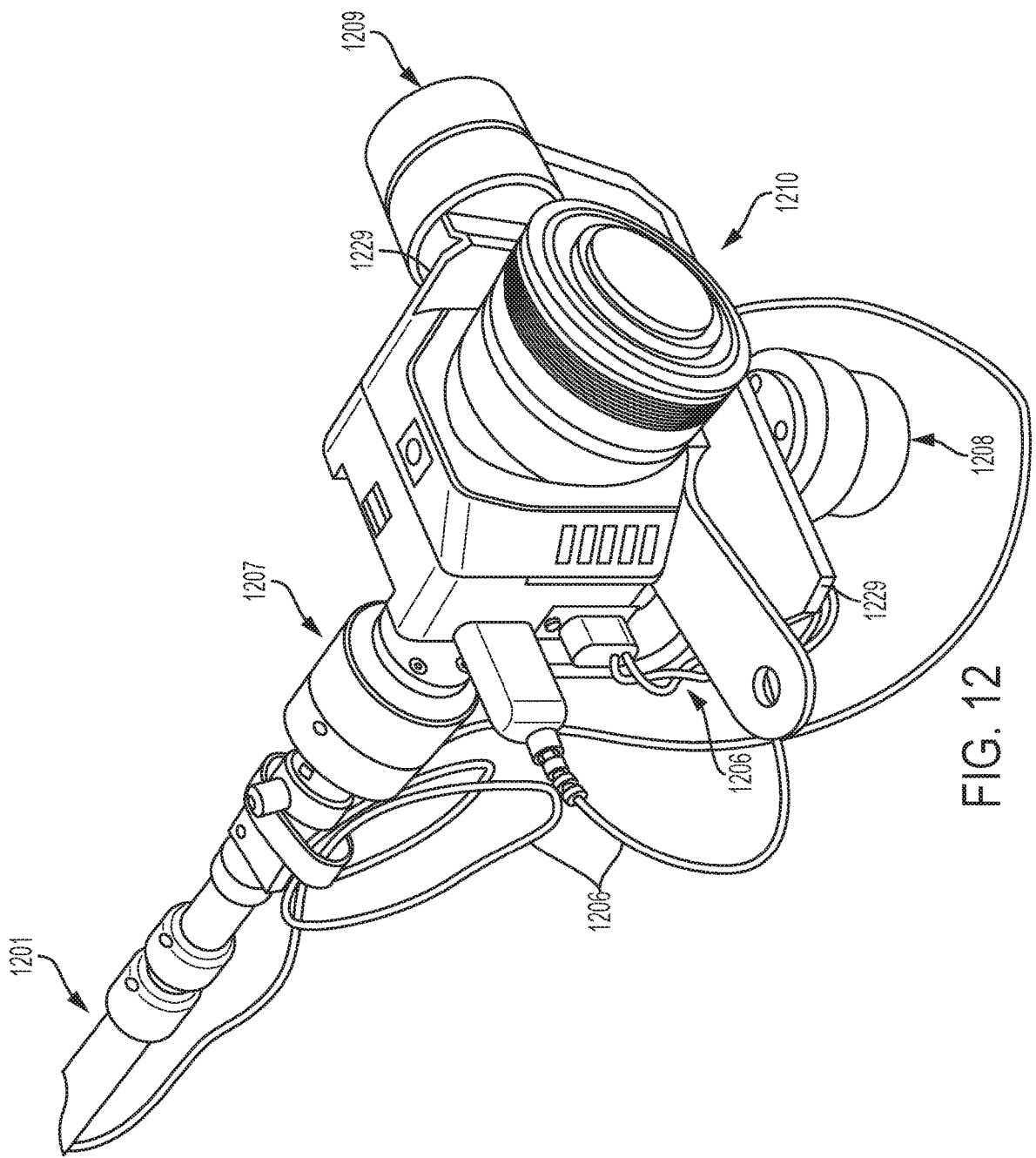
FIG. 12 illustrates an example view of a second end of the monopod jib having a camera attached thereto.

As described herein, and referring to FIG. 12, output from the first and second user interface elements 102, 103 are provided to the camera 1210 and/or motors 1207, 1208, and/or 1209 to control the viewing angle and settings of the camera 1210, which is mounted at the end of the monopod jib 1201 on a camera mounting plate 1229. As described herein, various cabling 1206 may be used to facilitate communication between the system components to provide control of the camera 1210 in response to the operator's inputs as well as to provide feedback, e.g., provide a display of an image captured by the camera 1210.

Figure 13:
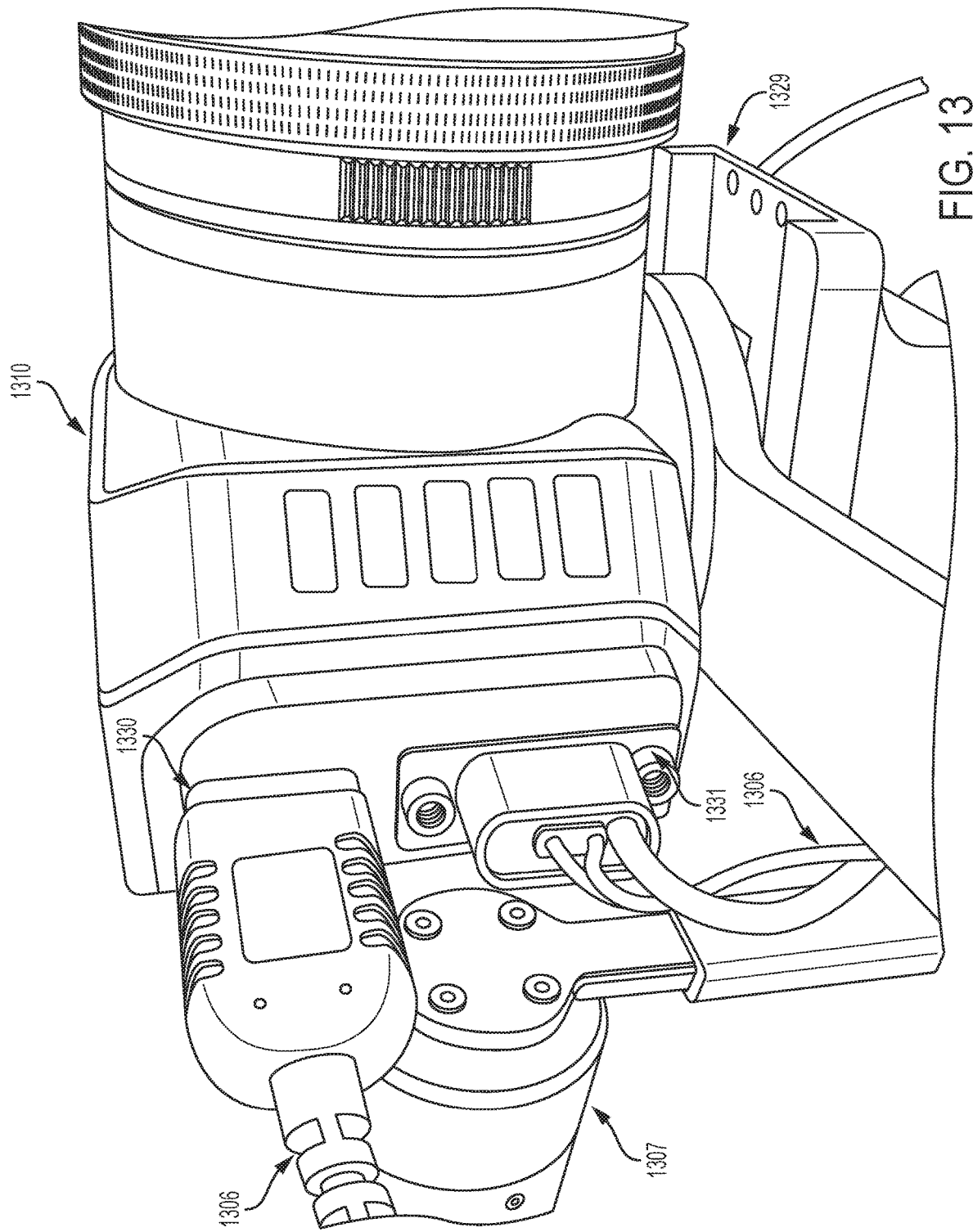
FIG. 13 illustrates an enlarged view of a side of the camera, input ports thereof, as attached to a camera mounting plate of the monopod jib.

FIG. 13 provides a non-limiting example view of the cabling routed to the camera 1310 in an embodiment, which again sits on a camera mounting plate 1329. In FIG. 13, the first motor 1307 of the gimbal is visible.

In the example of FIG. 13, the camera 1310 has cabling 1306 that is inserted into an HDMI port 1330 (for audio/video data communication to monitor) and into a power and data port 1331 of the camera 1310. As has been described herein, the power and data port 1331 may be used to communicate control data from various microcontrollers to the camera 1310. The exact cabling 1306 and ports used will be dictated by the camera chosen for implementation.

Similarly, while example controls have been described herein for the user interface, the user interface also provides buttons that can selectively (e.g., as mapped by software) control auto-focus, auto-iris, white-balance, gain, record start/stop, and other features as exposed by the camera manufacturer.

In an embodiment, status feedback also may be provided to the operator. For example, buttons on the user interface elements 102, 103 can be illuminated to indicate operation status, whereas configuration switches may convey their settings using illumination.

It should be noted that the various functions described herein may be implemented using instructions stored on a device readable storage medium such as a non-signal storage device that are executed by a processor. In the context of this document, a storage device is not a signal and "non-transitory" includes all media except signal media.

Program code embodied on a storage medium may be transmitted using any appropriate medium, including but not limited to wireless, wireline, optical fiber cable, RF, etc., or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device.

In some cases, the devices or components referred to herein communicate by a connection facilitated through network, e.g., a local area network (LAN) or a wide area network (WAN), or the connection may be made through other devices, through wireless connections, e.g., near-field communication, or through a hard wire connection, such as over a USB connection or bus communications as described herein.

Example embodiments are described herein with reference to the figures, which illustrate example methods, devices and products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific figures are used, and particular examples have been illustrated, these are non-limiting examples. In certain contexts, two or more elements may be combined, an element may be split into two or more elements, or certain elements may be re-ordered or reorganized as appropriate, as the explicit illustrated examples are used only for descriptive purposes and are not to be construed as limiting.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A monopod jib for cameras, comprising:
   a pole;
   a multi-axis gimbal disposed at one end of the pole; and
   a user interface comprising:
      a first user interface element disposed at a first location on the pole, wherein the first user interface element comprises a first plurality of camera controls; and
      a second user interface element disposed at a second location on the pole, wherein the second user interface element comprises a second plurality of camera controls; and
      a third user interface element comprising a plurality of configuration elements for changing configurations of the first plurality of camera controls and the second plurality of camera controls.

2. The monopod jib for cameras of claim 1, wherein the first location is different location from the second location on the pole.

3. The monopod jib for cameras of claim 2, wherein the first location is a first grasping position of the pole and the second location is a second grasping position of the pole.

4. The monopod jib for cameras of claim 1, wherein the first plurality of camera controls comprise at least one button and a rocker switch.

5. The monopod jib for cameras of claim 4, wherein the at least one button comprises two buttons positioned on lateral sides of an upper side of the first user interface element.

6. The monopod jib for cameras of claim 1, wherein the first user interface comprises a joystick.

7. The monopod jib for cameras of claim 4, wherein the rocker switch is positioned on a bottom side of the first user interface element.

8. The monopod jib for cameras of claim 1, wherein outputs of the first user interface are mapped to a control selected from the group consisting of pan control, tilt control, white balance control, and zoom control.

9. The monopod jib for cameras of claim 1, wherein the second plurality of camera controls comprise at least two wheels.

10. The monopod jib for cameras of claim 9, wherein each of the at least two wheels is positioned on one of an upper side or a lower side of the second user interface.

11. The monopod jib for cameras of claim 1, wherein the second plurality of camera controls comprise at least two buttons, wherein the at least two buttons are positioned on lateral sides of an upper side of the second user interface.

12. The monopod jib for cameras of claim 1, wherein outputs of the second plurality of camera controls are mapped to a camera control selected from the group consisting of iris control, focus control, shutter control, and gain control.

13. A system, comprising:
    a monopod jib for cameras, comprising:
    a pole;
    a multi-axis gimbal disposed at one end of the pole;
    a battery box disposed at an opposite end of the pole comprising a plurality of configuration elements; and
    a user interface comprising:
       a first user interface element having a first plurality of camera controls; and
       a second user interface element having a second plurality of camera controls,
    wherein the plurality of configuration elements establish configurations for the first plurality of camera controls and the second plurality of camera controls.

14. The system of claim 13, further comprising a monitor mount and a monitor coupled to the monitor mount.

15. The system of claim 13, further comprising a plurality of motors positioned about the multi-axis gimbal.

16. The system of claim 15, further comprising a plurality of microcontrollers.

17. The system of claim 16, wherein the plurality of microcontrollers comprise a main microcontroller, a microcontroller operatively coupled to the first user interface element, a microcontroller operatively coupled to the second user interface element, and a camera microcontroller.

18. The system of claim 16, further comprising a main microcontroller operatively coupled to the plurality of microcontrollers.

19. The system of claim 18, wherein the main microcontroller is configured to coordinate commands from the first user interface element and the second user interface element to a camera configured to be attached to the monopod jib.

20. A method, comprising:
    grasping a monopod jib with a first hand and a second hand;
    providing inputs to a first user interface element disposed on the monopod jib and located proximate to the first hand; and
    providing inputs to a second user interface element disposed on the monopod jib and located proximate to the second hand;
    wherein the inputs from the first user interface element and the inputs from the second user interface element are implemented according to configurations set by a plurality of configuration elements associated with the monopod jib and wherein the inputs from the first user interface element and the inputs from the second user interface element collectively control both camera position and image quality of a camera mounted to an end of the monopod jib.

* * * * *

UNITED STATES PATENT AND TRADEMARK OFFICE
CERTIFICATE OF CORRECTION

| | | |
|---|---|---|
| PATENT NO. | : 10,547,773 B2 | Page 1 of 1 |
| APPLICATION NO. | : 15/429666 | |
| DATED | : January 28, 2020 | |
| INVENTOR(S) | : Gunter D. Niemeyer et al. | |

It is certified that error appears in the above-identified patent and that said Letters Patent is hereby corrected as shown below:

In the Claims

In Column 11, Line 36, in Claim 2, after "is" insert -- a --.

In Column 11, Line 49, in Claim 6, after "interface" insert -- element --.

In Column 11, Line 54, in Claim 8, after "interface" insert -- element --.

In Column 11, Line 62, in Claim 10, delete "interface." and insert -- interface element. --, therefor.

In Column 12, Line 4, in Claim 11, delete "interface." and insert -- interface element. --, therefor.

Signed and Sealed this
Twelfth Day of May, 2020

Andrei Iancu
*Director of the United States Patent and Trademark Office*